(No Model.) 4 Sheets—Sheet 1.
A. TORNAGHI.
APPARATUS FOR AMALGAMATING AND CONCENTRATING.
No. 513,158. Patented Jan. 23, 1894.
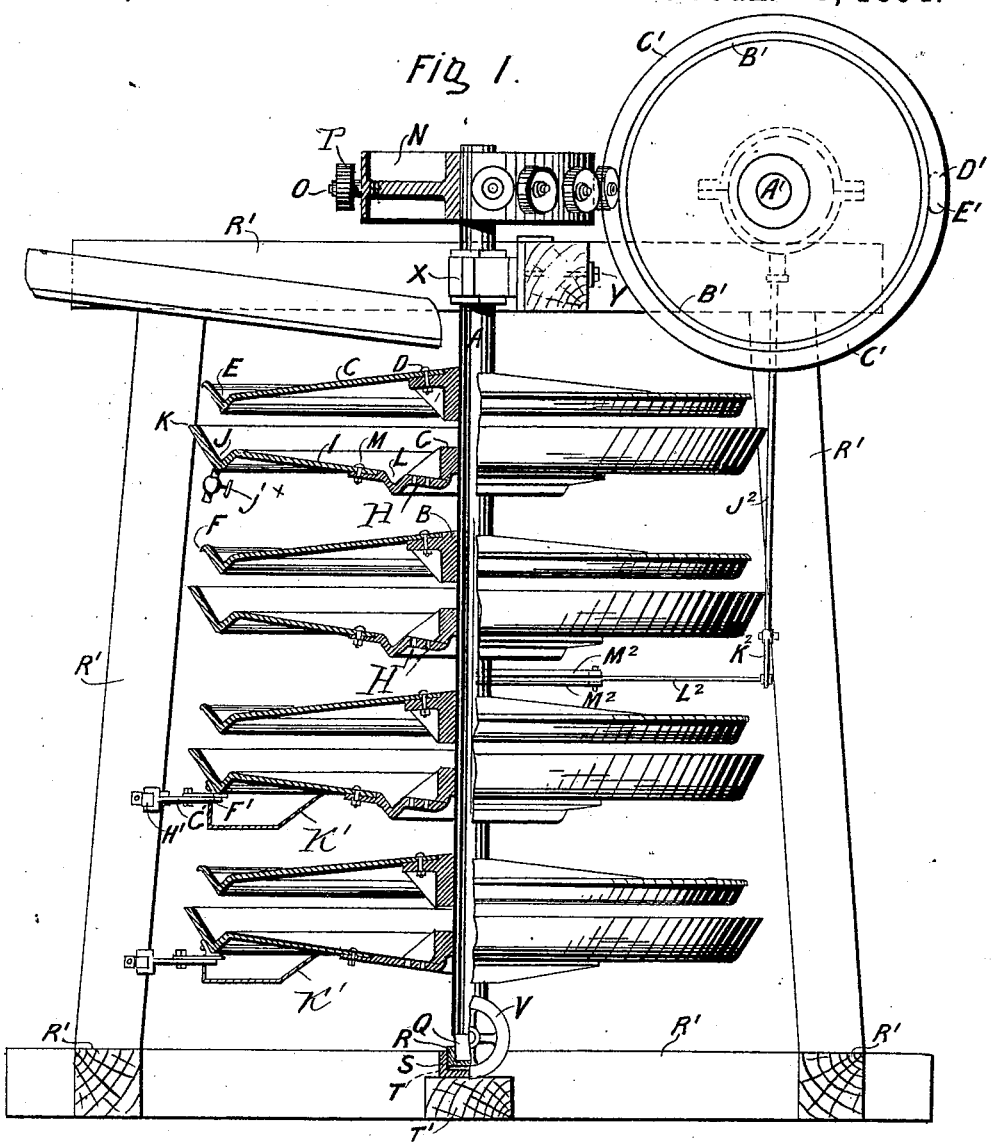
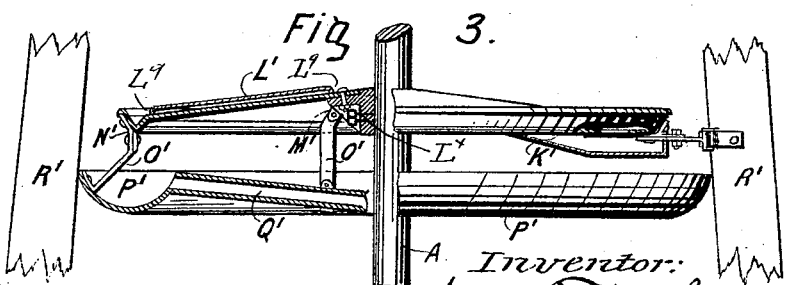
Witnesses:
E. B. Botton
E. K. Sturtevant
Inventor:
Angelo Tornaghi
By Richards & Co
his Attorneys.

(No Model.) 4 Sheets—Sheet 2.
A. TORNAGHI.
APPARATUS FOR AMALGAMATING AND CONCENTRATING.
No. 513,158. Patented Jan. 23, 1894.
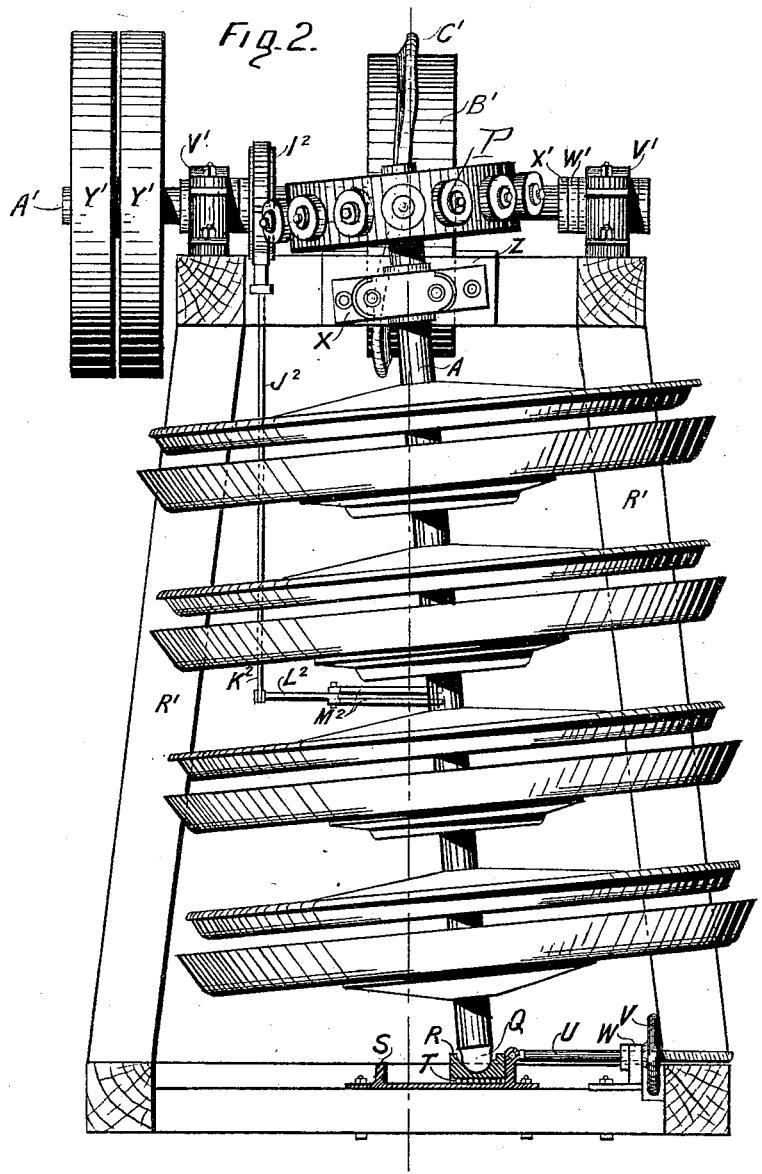
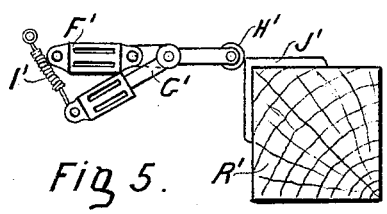
Witnesses:
E. R. Botton
E. H. Sturtevant
Inventor:
Angelo Tornaghi
By Richards & Co
his Attorneys (No Model.) 4 Sheets—Sheet 3.
A. TORNAGHI.
APPARATUS FOR AMALGAMATING AND CONCENTRATING.
No. 513,158. Patented Jan. 23, 1894.
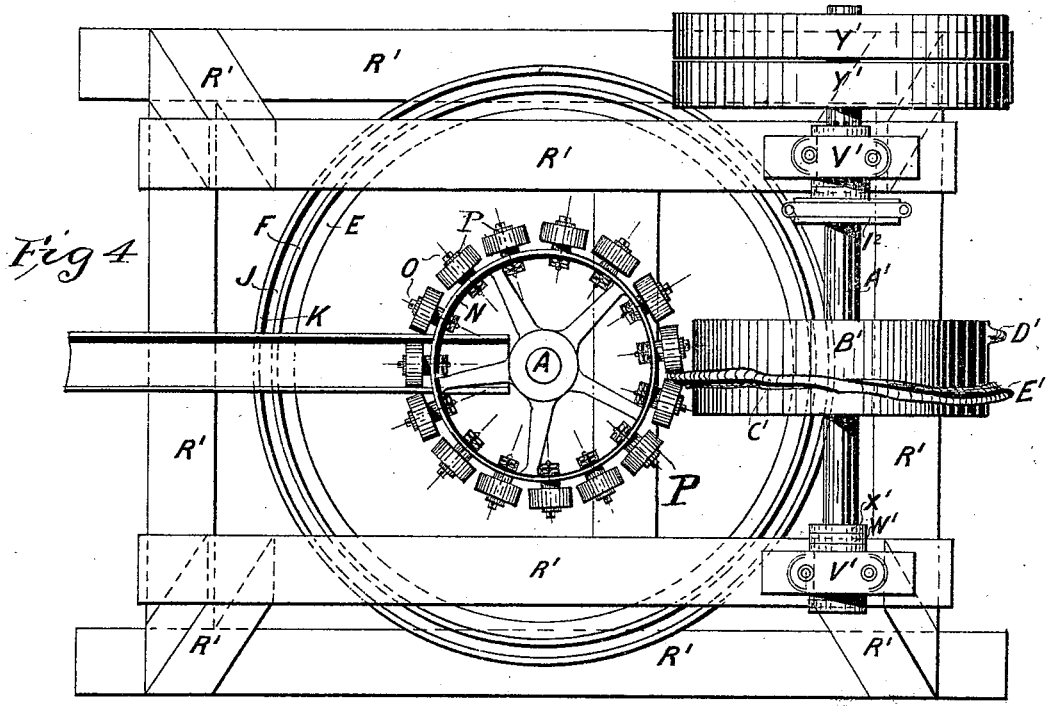
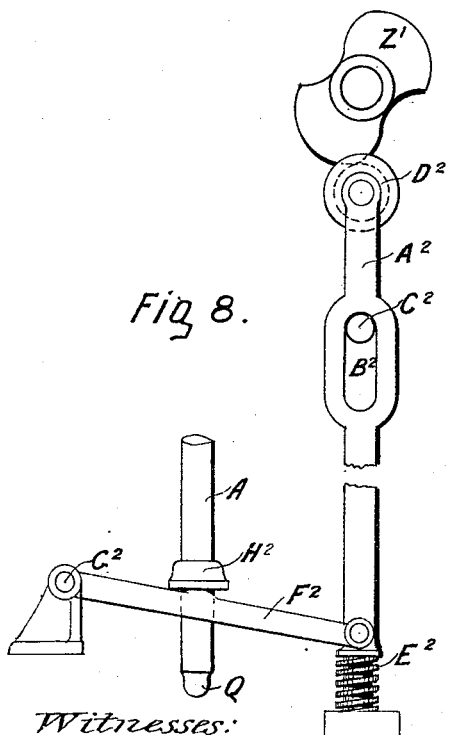
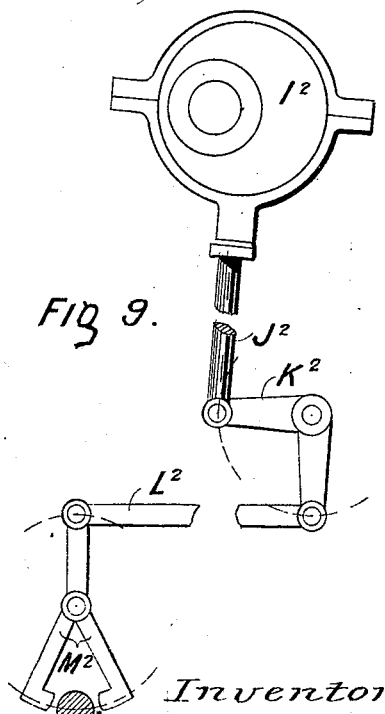

(No Model.) 4 Sheets—Sheet 4.
A. TORNAGHI.
APPARATUS FOR AMALGAMATING AND CONCENTRATING.
No. 513,158. Patented Jan. 23, 1894.
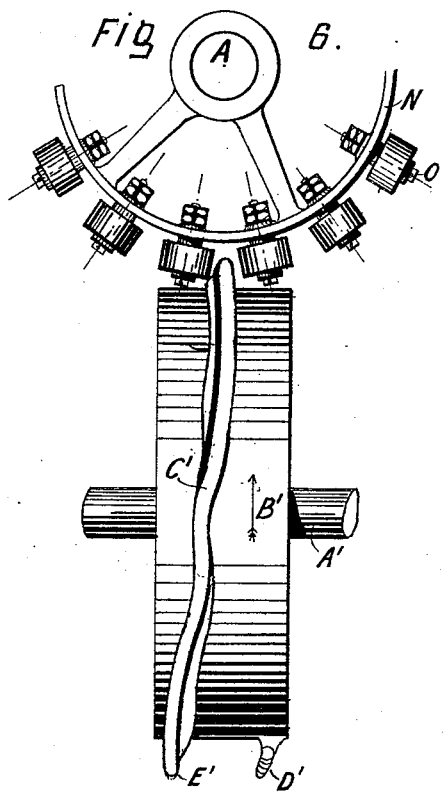
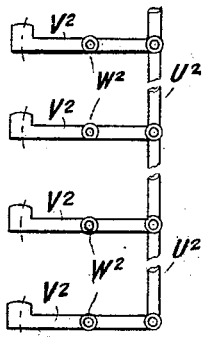
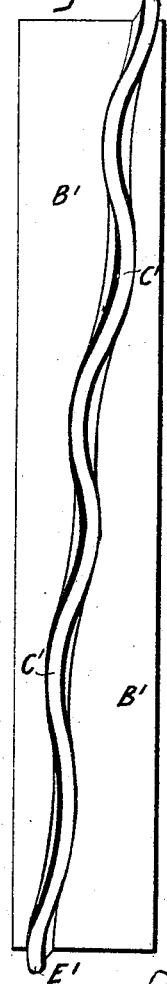
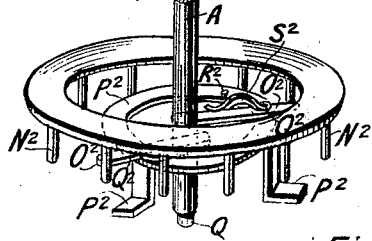
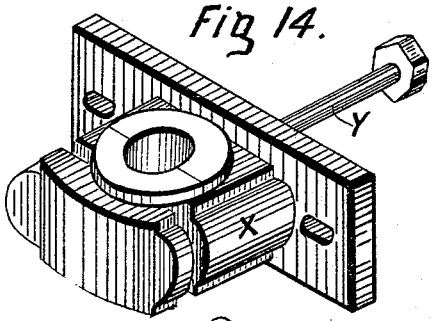
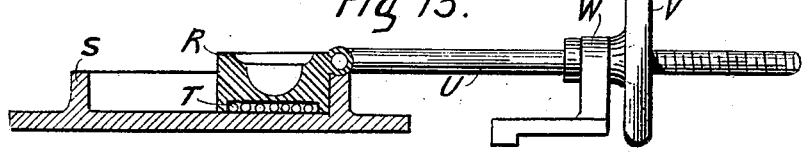
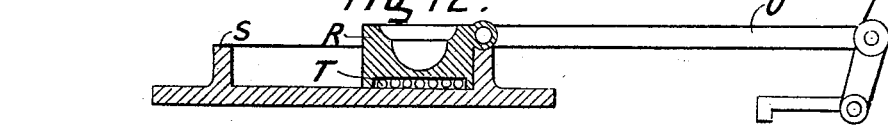

United States Patent Office.

ANGELO TORNAGHI, OF SYDNEY, NEW SOUTH WALES.

APPARATUS FOR AMALGAMATING AND CONCENTRATING.

SPECIFICATION forming part of Letters Patent No. 513,158, dated January 23, 1894.

Application filed December 5, 1892. Serial No. 454,202. (No model.)

*To all whom it may concern:*

Be it known that I, ANGELO TORNAGHI, a subject of the Queen of Great Britain, and a resident of Enmore, in the city of Sydney, New South Wales, have invented a new and useful Apparatus for Amalgamating and Concentrating; and I do hereby declare that the following is a full, clear, and exact description of the invention, which will enable others skilled in the art to which it appertains to make and use the same.

In the drawings, Figure 1— is a part elevation and vertical section of the apparatus. Fig. 2— is an elevation with the trays tilted.
Fig. 3— is a detail view of a tray having a trough suspended therefrom. Fig. 4— is a plan view of Fig. 1. Fig. 5— is a detail of the discharge valve. Fig. 6— is a detail plan view of the worm wheel and driving wheel.
Fig. 7— shows the worm edge developed. Figs. 8, 9, 10 and 11— show various modifications of the mechanism for giving the trays a jarring or vibrating action. Fig. 12— is a detail view of the toe step and lever. Fig. 13— is a detail view of a modification. Fig. 14— is a detail view of the top bearing for the shaft.

My invention relates to an apparatus consisting of a number of trays, C I, which may be either circular, polygonal, or other convenient form, placed upon a vertical spindle A, by means of which I am able to carry out the operations of amalgamation and concentration, either singly or in combination, for the purpose of saving gold or minerals containing gold after it has been freed from the matrix by pulverization or other means. These trays are also made serviceable in retarding and collecting float gold whose lightness and fineness render it liable to be carried off easily on the surface of the water. To this apparatus I impart a rotary, vibratory, and jarring motion; these three movements may be used either separately or in combination by the attachment of certain mechanical devices which may be varied in form according to the class of material under treatment. The vertical spindle carrying the trays is capable of adjustment, and may be moved out of its vertical position for the purpose of tilting the trays so as to discharge their contents.

The manner of constructing my apparatus is as follows: The vertical spindle A, which may be either hollow or solid, or hollow for part of its length and surmounted with a hopper, has secured to it, at suitable intervals, a series of trays C I placed preferably in pairs, the upper one C having an inclination from its boss B toward the periphery, and the lower one I being similarly inclined toward the central hub or boss G which is provided with discharging outlets or perforations H. The trays, which may be either copper, iron, enameled iron, or other suitable metal or material, and may be in form either plain, corrugated, or undulated, are provided with, in the case of the first or upper tray, a V or other suitable shaped mercury trough E placed at its outer edge. The lip or outer edge of the trough is made sufficiently high to prevent the overflow of the mercury. The second tray is also provided with a trough J at its outer edge, somewhat similar in form to that of the upper tray but preferably deeper, and with the outer edge or lip K so situated that the material descending from the upper tray will drop upon the inclined surface and be diverted to the bottom of the trough where the mercury is placed, so that the gold may be intercepted and commingle with the mercury. The tray I of which this trough forms a part has an inclination from the periphery toward the center, and is also provided with a secondary intercepting mercury trough L through which the material passes prior to reaching the outlets or discharging orifices situated around the central boss or hub G. Each alternate tray is then constructed similarly.

D represents bolts connecting the tray C to its hub while M are bolts connecting the tray I to hub G.

For some classes of ore I find it preferable to dispense with the second tray and substitute therefor a trough only, shown at P' Fig. 3, which I suspend by rods O' and lugs N' M' to the first or upper tray immediately below the mercury trough. This circular trough is fitted with outlet or discharging pipes Q' placed radially so as to discharge toward the center of the spindle on which the bosses or hubs of the trays are secured.

Where the two trays are used in combination the bosses are provided with a set screw L$^x$, or such suitable device, for the purpose of adjusting or regulating the distance they shall be apart, which can only be ascertained by the class of ore under treatment. When the trays are made of copper, they may be silvered or electro-plated. At the outer edge, and on the under side, a sufficient number of discharging valves F' are placed, which are put in motion as the trays rotate by means of a lever G' carrying a roller H' spring I', and striking plate J' on the frame R', or similar suitable device. These valves discharge into receivers K' also attached to the under sides of the trays. These valves arranged as shown operate at regular intervals to discharge the mercury into the receivers, the intervals being so regulated that the mercury reaches a certain degree of richness before being discharged from its pan.

The mercury troughs are provided with outlet taps for draining off the mercury, such as at $j^x$, Fig. 1.

I do not confine myself to the number of trays to be used, which can only be ascertained by the class of auriferous material to be treated; and, the method of placing the trays alternately may be varied by the omission of the secondary intercepting trough.

The characteristic results obtained by the use of my apparatus are, first, the separation or extraction of the gold or other precious metal, and, secondly, the collection of the concentrates which may contain precious metals; the former usually taking place in the upper tray, and the latter in the lower one.

The rotary and vibratory motions are obtained by using a form of gearing consisting of a wheel N carrying a series of rollers P placed equi-distant upon studs O radiating from the center of the vertical spindle upon the upper end of which the wheel is secured, and, a screw or worm B' partially developed and provided with a sinuous or serpentine edge C'. The manner of constructing this screw is to divide it into a series of zig-zag lengths, each length diverging with a slight curve, so that, when the sinuous edge enters the space between the rollers, as it revolves, it causes the vertical spindle to rotate with a vibratory and undulatory movement which occurs many times during one revolution. The worm wheel or screw has its entering and retiring points D' and E' so arranged relatively that when it has completed one revolution the distance traveled will be equivalent to the distance the rollers are apart, so that before the retiring point leaves the roller on one side the entering point will pass into gear on the other side. Thus the motion is continued without intermission.

The driving shaft A' carrying the worm or screw may be driven by means of a pulley Y', spur, or other gearing and is journaled in boxes V'.

The means employed for intercepting the float gold (if such is known to exist) consists in using a floating plate L' Fig. 3 placed upon each tray and made preferably of silvered copper, but it may also be gauze wire or perforated iron. This floating plate is constructed with distance pieces bearing points or projections L$^9$ on the under side which cause it to stand the requisite distance above the surface of the tray, thus forming a space between the under side of the plate and the upper surface of the tray.

Upon the driving shaft, in proximity to the outer bearing, between the collar X' on the journal and the face of the brasses, I insert a spring or rubber ring W', for the purpose of overcoming the jar or shock incidental to the action of the vibratory undulatory motion.

An independent tappet action to impart a jarring motion to each of the trays is obtained by the use of various mechanical contrivances, such as the use of a single or double face cam Z', or similar device, striking an impulse rod A$^2$ attached to a lever F$^2$ pivoted at G$^2$ and engaging the tappet collar H$^2$ on the vertical shaft. The impulse lever has a roller D$^2$ bearing on the cam and is slotted at B$^2$ to receive the guide pin C$^2$. A spring E$^2$ applies a tension to the parts. The jarring may be obtained by striking the vertical spindle laterally by means of a striking bar M$^2$ operated either from the vertical spindle or from the driving shaft by means of an eccentric I$^2$ and intermediate rods and levers J$^2$ K$^2$ and L$^2$ Fig. 9, or from an attachment such as a series of studs attached N$^2$ Fig. 10 to the under side of the lowest tray operating beaters Q$^2$ fixed to a standard P$^2$ such beaters being retained in position by suitable springs S$^2$, by which they are made to press against the vertical spindle; the aforesaid studs during the rotary movement of the tray, are brought in contact with the beaters, producing an intermittent movement by which they are made to strike the vertical spindle.

R$^2$ are stop pins for the springs S$^2$. Instead of this mechanism, a series of beaters V$^2$ Fig. 11, pivoted at W$^2$ may be used, one or more of which may be made to operate upon each tray by means of the rod U$^2$ connected to an eccentric T$^2$ operated from the driving shaft.

The adjustment of the vertical spindle for the purpose of tilting the trays is obtained by pivoting the upper bearing X so that by releasing the holding bolts it will move with the spindle on its axis Y; the lower bearing or toe step R is placed upon friction rollers T running in a sliding groove or frame S, called a traverser, and, by means either of a lever X$^2$ and rod U Fig. 12, or screw U passing through bearing W and hand wheel V may be adjusted to any desired position.

As shown in Fig. 11—beaters V$^2$ may be provided to act on the various trays, these beaters being pivoted at W$^2$ and connected to a rod U$^2$ operated from an eccentric T$^2$.

To carry out the operations of amalgamating and concentrating in my apparatus, the pulverized material is fed by any suitable means, such as a launder, upon the topmost tray in close proximity to the central spindle, and, by the rotary, vibratory, and jarring motions, is spread over the surface of the tray. By reason of this tray having a slope toward the periphery, the material is carried to the outer edge, and, passing through the mercury in the outer trough, falls over the edge of the tray on to the inner face of the projecting lip of the outer mercury trough in the second tray, whence it is diverted through the mercury in that trough and flows thence over the surface of the second tray toward the central boss or hub, being spread over the surface of the tray in the same manner as in the topmost tray. Before reaching the center, however, it passes through the secondary intercepting trough situated in the second tray and from thence through the perforations or outlets in the boss or hub supporting that tray on to the next tray which is similar in form to the upper tray. The trays being arranged in pairs the operation is repeated until the last of the trays is reached.

Having thus particularly described and ascertained the nature of my said invention and in what manner the same is carried into effect, what I claim, and desire to secure by Letters Patent of the United States of America, is—

1. In combination, the trays with means for supporting and rotating the same, the automatically operating valves F' and the catch pans K secured to the under side of the trays, substantially as described.

2. In combination, the vertical shaft having a horizontal wheel N at its upper end provided with projections, the trays supported on said shaft and the worm wheel having a sinuous edge C' adapted to fit between two of the said projections, and having entering and retiring points D' E', substantially as described.

3. In combination, the vertical shaft having the wheel N at its upper end provided with radially projecting rollers P, the trays on the shaft and the worm wheel having a sinuous edge C' adapted to pass between two of the said rollers, substantially as described.

4. In combination, with the trays and the means for rotating the same, the floating plate having downwardly extending bearing points $L^9$, said plate being thus elevated slightly to intercept the float gold, substantially as described.

5. In combination, the shaft, the trays thereon, the means for rotating the shaft and trays, the beaters operating laterally against the shaft from opposite sides thereof and the means for operating said pivoted beater arms, substantially as described.

6. In combination, the shaft, the trays carried thereby, the driving shaft A', the worm wheel B' thereon, the connection between said wheel and the tray shaft and the cushion W' on the shaft A' adapted to take the thrust produced by the sinuous edge of the worm wheel, substantially as described.

In testimony whereof I have signed my name to this specification, in the presence of two subscribing witnesses, this 1st day of October, A. D. 1892.

ANGELO TORNAGHI.

Witnesses:
HARRY A. SMEDLEY,
ARTHUR J. STONE.